(12) United States Patent
Adachi

(10) Patent No.: US 8,510,593 B2
(45) Date of Patent: Aug. 13, 2013

(54) CONTROL APPARATUS

(75) Inventor: Noriaki Adachi, Inzai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/886,211

(22) Filed: Sep. 20, 2010

(65) Prior Publication Data

US 2011/0072317 A1   Mar. 24, 2011

(30) Foreign Application Priority Data

Sep. 24, 2009  (JP) ................................. 2009-219220

(51) Int. Cl.
*G06F 11/00* (2006.01)

(52) U.S. Cl.
USPC ........... 714/5.1; 358/1.14; 714/4.5; 714/5.11; 714/14; 714/23; 714/24; 714/32; 714/33; 714/43; 714/44; 714/56

(58) Field of Classification Search
USPC ................... 358/1.14; 714/4.5, 5.1, 5.11, 14, 714/23, 24, 32, 33, 43, 44, 56
See application file for complete search history.

(56) References Cited

U.S. PATENT DOCUMENTS

| | | | | |
|---|---|---|---|---|
| 4,553,204 A * | 11/1985 | Hashimoto | ..................... | 714/24 |
| 4,755,996 A * | 7/1988 | Masuda | ........................... | 714/23 |
| 4,951,069 A * | 8/1990 | Rabjohns et al. | ............. | 347/129 |
| 5,068,853 A * | 11/1991 | Soma et al. | ...................... | 714/24 |
| 5,095,438 A * | 3/1992 | Sasaki | ........................... | 701/114 |
| 5,491,794 A * | 2/1996 | Wu | ................................ | 714/23 |
| 6,028,675 A * | 2/2000 | Fields et al. | .................. | 358/1.14 |
| 6,430,711 B1 * | 8/2002 | Sekizawa | ..................... | 714/47.2 |
| 6,490,692 B1 * | 12/2002 | Nomura et al. | ................. | 714/15 |
| 7,146,534 B2 * | 12/2006 | Yamada | .......................... | 714/23 |
| 7,249,283 B2 * | 7/2007 | Platteter | ......................... | 714/25 |
| 7,352,486 B2 * | 4/2008 | Tsuchiya et al. | ............. | 358/1.15 |
| 7,536,124 B2 * | 5/2009 | Yoshimoto | ....................... | 399/33 |
| 7,590,362 B2 * | 9/2009 | Yamauchi et al. | ............. | 399/18 |
| 7,657,788 B2 * | 2/2010 | Choi | ............................... | 714/22 |
| 8,041,236 B2 * | 10/2011 | Kim et al. | ........................ | 399/33 |
| 2002/0015174 A1 * | 2/2002 | Nanpei | ........................ | 358/1.14 |
| 2002/0118383 A1 * | 8/2002 | Kamiya | ....................... | 358/1.13 |
| 2004/0064519 A1 * | 4/2004 | Kato et al. | .................... | 709/208 |
| 2005/0201794 A1 * | 9/2005 | Suzuki | .......................... | 399/405 |
| 2006/0031720 A1 * | 2/2006 | Choi | ................................. | 714/43 |
| 2007/0104498 A1 * | 5/2007 | Tachibana et al. | ............. | 399/19 |
| 2008/0240741 A1 * | 10/2008 | Sasama et al. | .................... | 399/9 |
| 2009/0225348 A1 * | 9/2009 | Miyake et al. | ............... | 358/1.14 |
| 2009/0327808 A1 * | 12/2009 | Takizawa | ........................ | 714/24 |
| 2010/0054766 A1 * | 3/2010 | Kim et al. | ........................ | 399/33 |
| 2011/0131441 A1 * | 6/2011 | Asauchi | ........................ | 713/501 |

FOREIGN PATENT DOCUMENTS

JP       11-163885 A       6/1999

* cited by examiner

*Primary Examiner* — Joshua P Lottich

(74) *Attorney, Agent, or Firm* — Canon USA Inc IP Division

(57) ABSTRACT

A control apparatus includes a lower layer control unit configured to perform control of a load, an upper layer control unit configured to control the lower layer control unit, a communication unit configured to perform communication between the upper layer control unit and the lower layer control unit via a communication line, a detection unit configured to detect power supply voltage of the lower layer control unit, wherein the upper layer control unit detects communication abnormality of the communication unit and notifies the communication abnormality, the upper layer control unit notifying abnormality of power supply voltage of the lower layer control unit, in such a manner as to be identified from the communication abnormality of the communication unit.

5 Claims, 6 Drawing Sheets

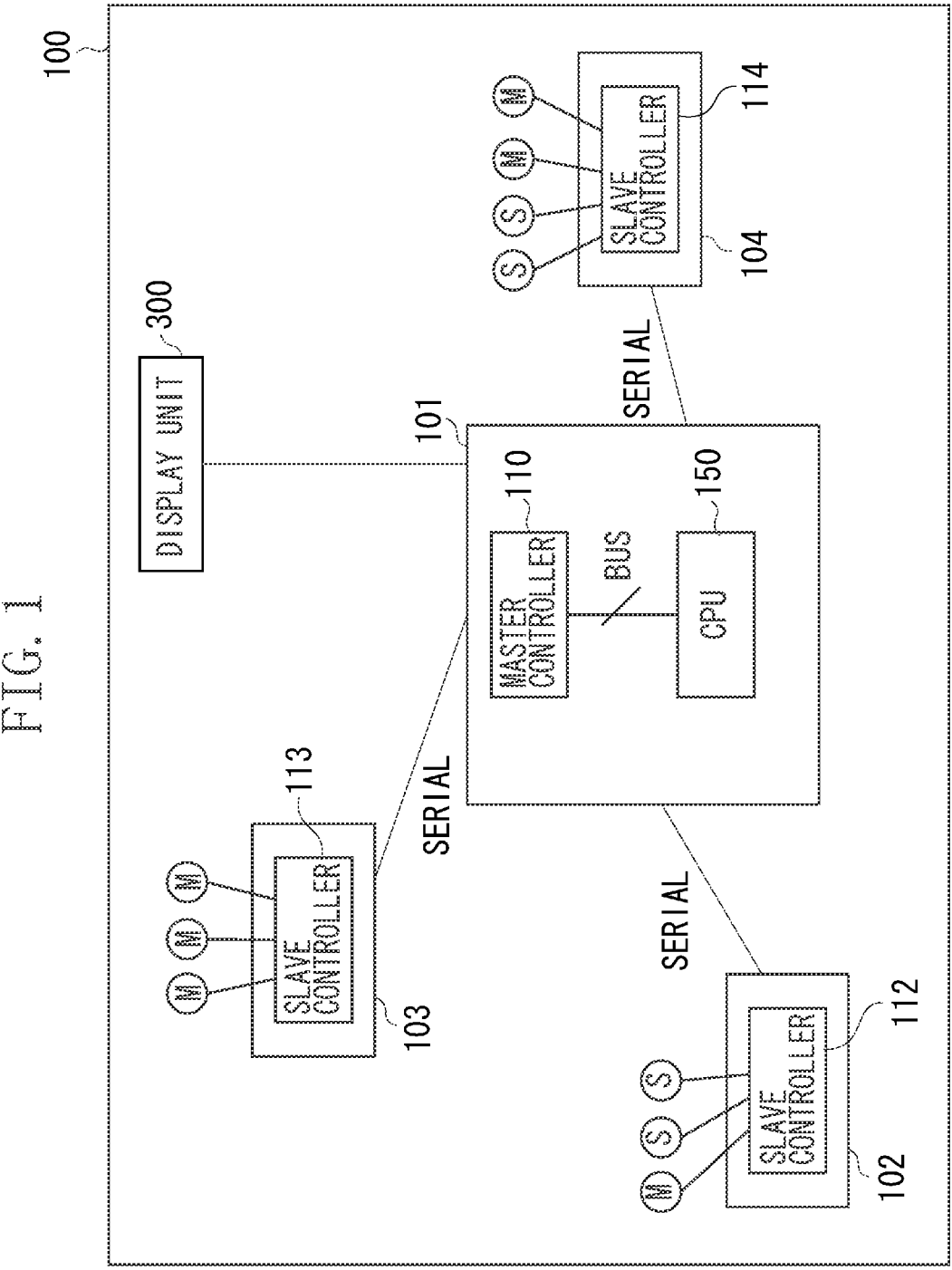

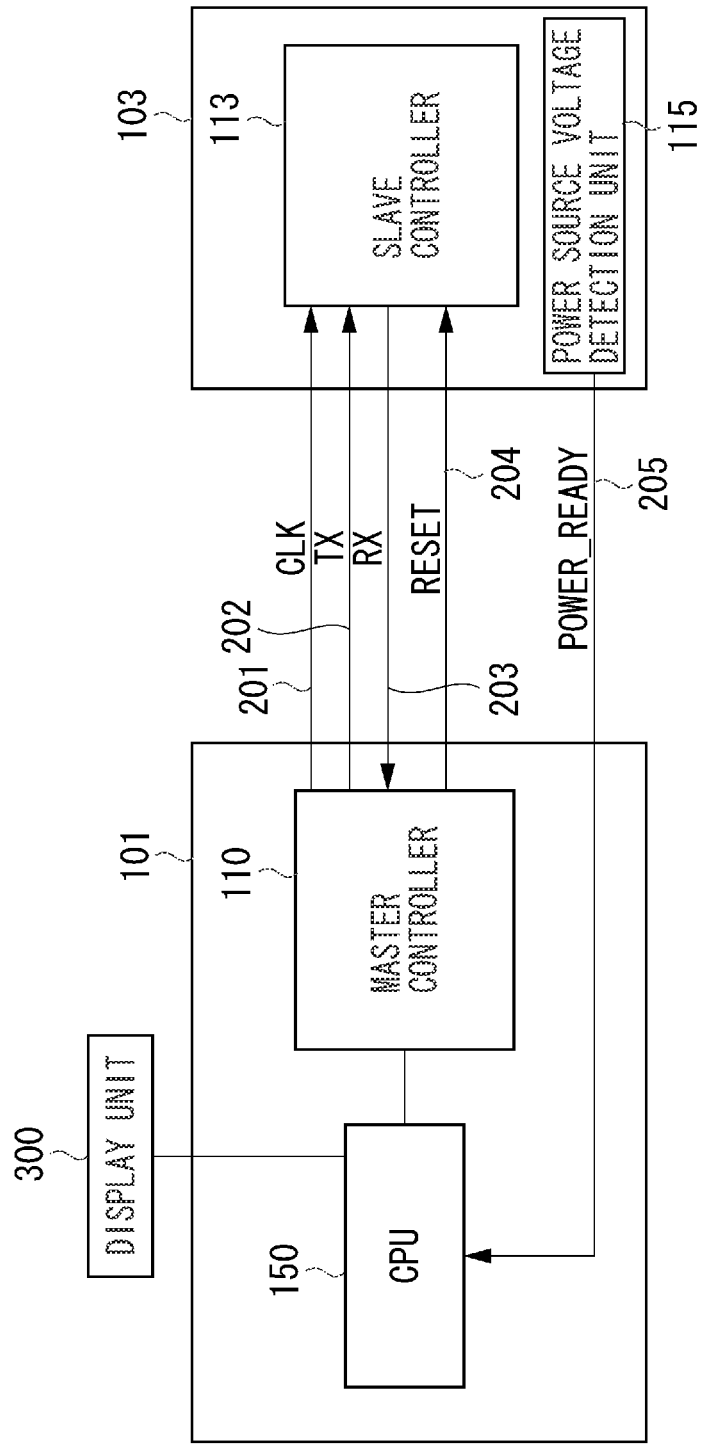

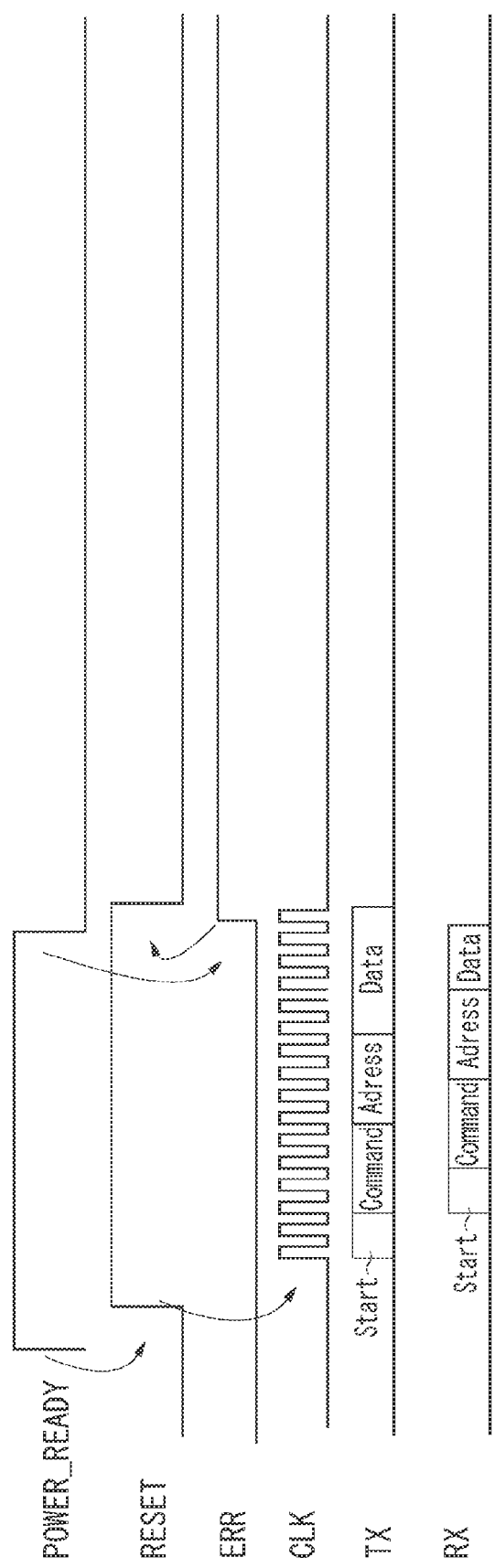

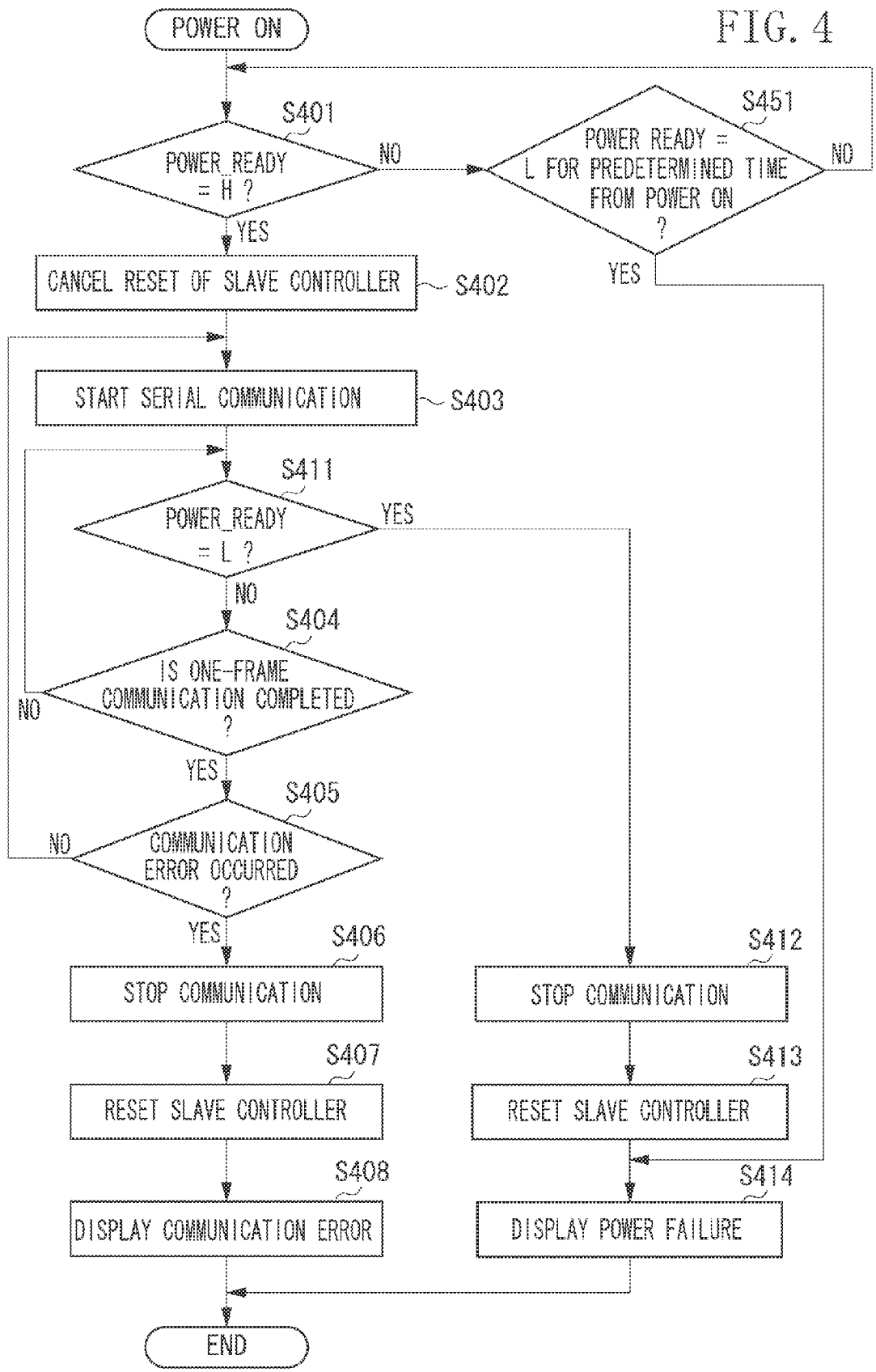

CONTROL APPARATUS

BACKGROUND OF THE INVENTION

1. Field of the Invention

The present invention generally relates to control and, more particularly, to a control apparatus including a lower layer control unit that performs control of a load, an upper layer control unit that controls the lower layer control unit, and a communication line that performs communication between the upper layer control unit and the lower layer control unit.

2. Description of the Related Art

In conventional image forming apparatus, a plurality of loads have been driven and controlled with one controller. However, along with an increasing scale of apparatuses and loads, wiring between a controller and loads increases and becomes complicated, thus operating cost tends to increase.

Thus, a configuration in which a plurality of slave controllers for driving and controlling loads arranged in a distributed manner in the vicinity of the loads, and these slave controllers are controlled by a master controller, is discussed in Japanese Patent Application Laid-Open No. 11-163885. Japanese Patent Application Laid-Open No. 11-163885 further discusses that in an apparatus in which the corresponding load is controlled by the slave controller that has received a load control request through serial communication from the master controller, the slave controller, when detecting a communication error between the master controller and thereof, perform control to stop the load.

However, the slave controller can autonomously stop the load at the time of trouble, whereas the master controller side cannot know the cause of the trouble.

Even if the master controller could recognize occurrence of communication error, communication error occurs when noise is mixed into a communication line, and in addition, occurs when there is abnormality in power supply voltage to the slave controller. As a result, the master controller cannot recognize its detailed cause. For this reason, the master controller cannot display the detailed cause of the error on the display unit at the time when an error occurs, and the service person or the like spends much time in tracking down the detailed cause of the error.

SUMMARY OF THE INVENTION

According to an aspect of the present invention, a control apparatus includes a lower layer control unit configured to perform control of a load, an upper layer control unit configured to control the lower layer control unit, a communication unit configured to perform communication between the upper layer control unit and the lower layer control unit via a communication line, and a detection unit configured to detect power supply voltage of the lower layer control unit, wherein the upper layer control unit detects communication abnormality of the communication unit and notifies the communication abnormality, the upper layer control unit notifying abnormality of power supply voltage of the lower layer control unit in accordance with a detection of the detection unit, in such a manner as to be identified from the communication abnormality of the communication unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an image forming apparatus 100 according to an exemplary embodiment of the present invention.

FIG. 2 is a block diagram illustrating communication between a master controller and a slave controller.

FIG. 4 is a flowchart illustrating processing that a system control unit 101 executes.

DESCRIPTION OF THE EMBODIMENTS

Figure 3A:
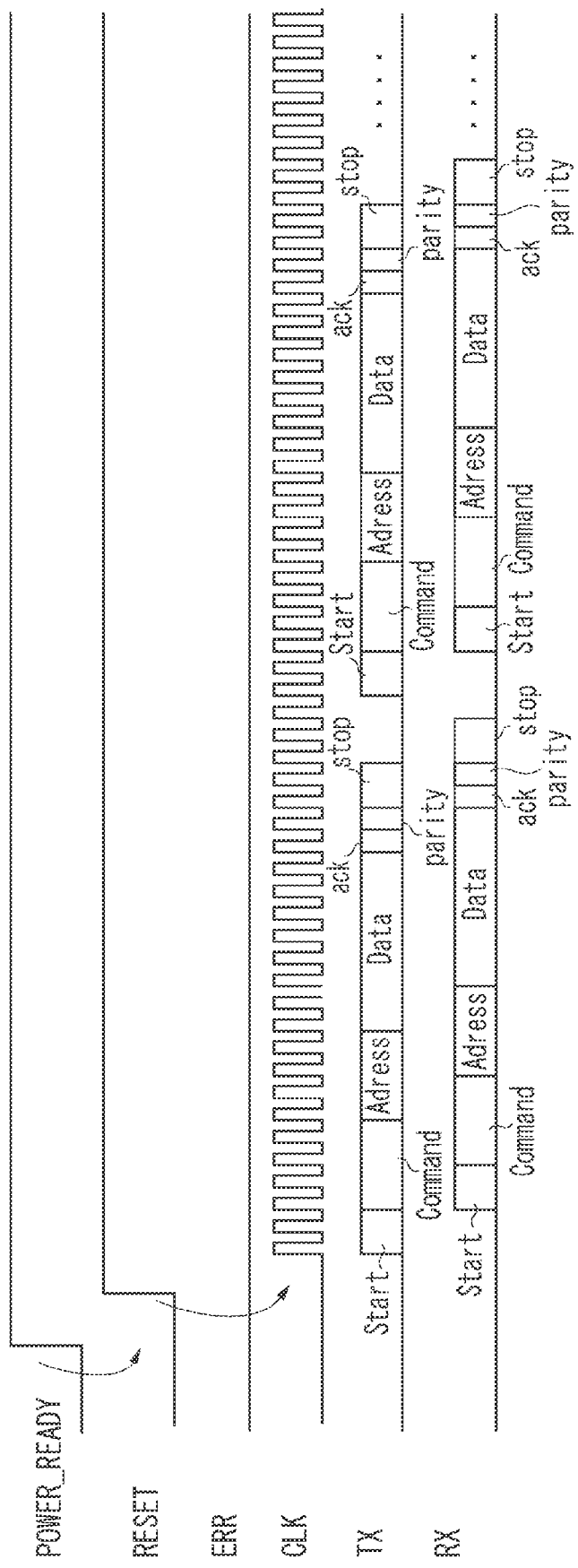
FIG. 3 is a timing chart of communications between the master controller and the slave controller.

Various exemplary embodiments, features, and aspects of the invention will be described in detail below with reference to the drawings.

FIG. 1 is a block diagram of an image forming apparatus 100 according to an exemplary embodiment of the present invention. The system control unit 101 (upper layer control unit) is arranged on the rear midsection of the image forming apparatus 100. Within the system control unit 101, a central processing unit (CPU) 150 that controls the system, and a master controller 110 that performs communication control are provided.

A sheet feeding unit control unit 104 includes a slave controller 114 (lower layer control unit) for operation control of loads that performs sheet feeding operation, and is arranged in the vicinity of a sheet feeding unit. A fixing unit control unit 103 includes a slave controller 113 (lower layer control unit) for operation control of loads that performs fixing operation, and is arranged in the vicinity of a fixing device.

Further, a sheet discharge unit control unit 102 includes a slave controller 112 (lower layer control unit) for operation control of loads that performs sheet discharge operation, and is arranged in the vicinity of a sheet discharge unit. The system control unit 101 performs command transmission to a plurality of slave controllers through serial communication, to integrally control the plurality of slave controllers.

FIG. 2 is a block diagram illustrating communication between the master controller and the slave controller. In FIG. 2, communication between the master controller 110 and the slave controller 113 is illustrated, however, communication with other slave controllers 112 and 114 is also similar to the communication with the slave controller 113.

The fixing unit control unit 103 includes the slave controller 113 for controlling a load of the fixing unit, and in addition, a power supply voltage detection unit 115 that detects power supply voltage of the fixing unit control unit 103.

As communication lines between master and slave, there are provided a clock signal line 201 for performing serial communication, a data signal transmission line 202 that transmits serial communication data from the master controller to the slave controller, and a data signal reception line 203 through which the master controller receives serial communication data from the slave controller.

The serial communication data is transferred in synchronization with a clock of the clock signal line 201 through the data signal transmission line 202 and the data signal reception line 203.

In addition, a reset signal line 204 for resetting the slave controller, and a power ready signal line 205 for notifying an abnormal voltage drop of the power source from the power supply voltage detection unit 115 to the system control unit 101 are provided between master and slave.

The master controller 110 detects communication abnormality of the serial communication by performing a known parity check for each frame of the serial communication between master and slave. The master controller 110, when detecting the communication abnormality, resets the slave controller 113 by outputting a reset signal to the reset signal line 204.

Figure 3B:
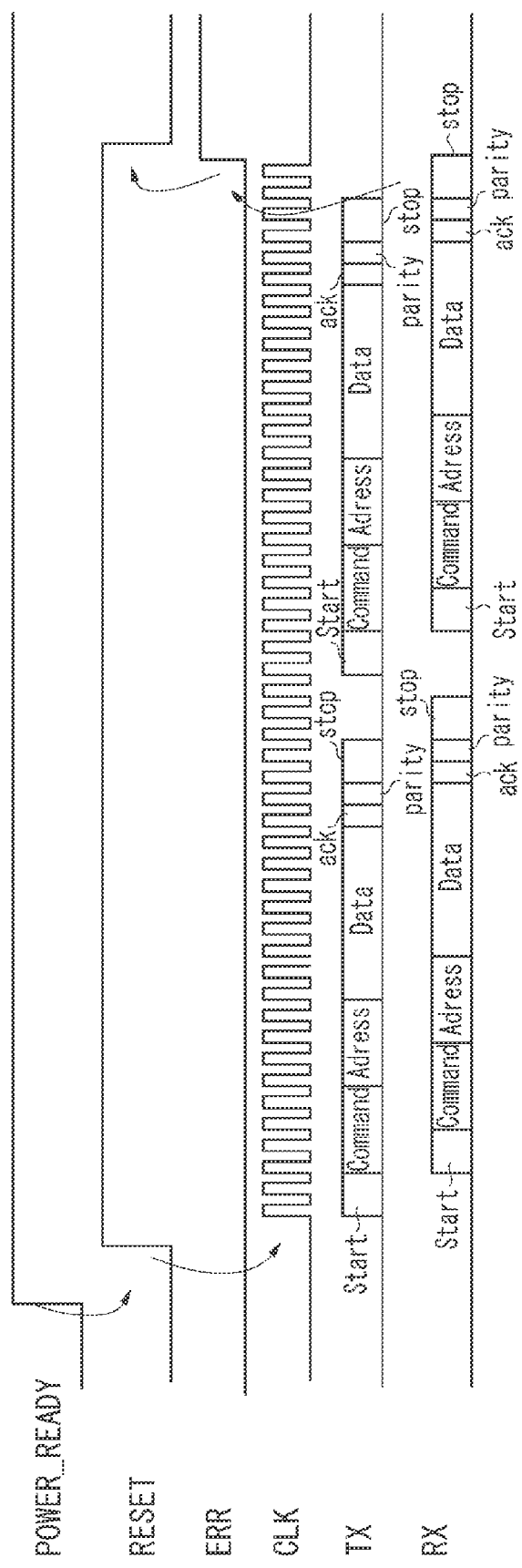

Next, a timing chart of communication between master and slave according to the present exemplary embodiment is illustrated in FIGS. 3A, 3B, and 3C. FIG. 3A is a timing chart when normal communication is performed. The master controller 110, when a power ready signal of a power supply voltage detection unit of a load unit becomes HIGH, cancels reset of the slave controller by turning the reset signal line to LOW. The master controller 110, after setting the reset signal line to LOW, starts serial communication.

FIG. 3B is a timing chart when communication abnormality is detected by the parity check. Similar to FIG. 3A, the master controller cancels the reset when the power ready signal becomes HIGH, and starts the serial communication. At the time when communication of one frame is completed, the master controller performs parity check by determining whether acknowledge (ACK) bits of RX data, or parity bits are correct.

If a result of the parity check is correct, the master controller starts communication of the next frame. The master controller, when determining that the serial communication is abnormal as a result of the parity check, immediately applies a reset to the slave controller, to stop the serial communication. FIG. 3B illustrates a case where ACK bits or parity bits of the second frame are abnormal.

When the slave controller is reset, the operation of each load is stopped by rendering an output to each load such as a motor or the like controlled by the slave controller to be high impedance. Therefore, when each load is shut down at the time when abnormality occurs, each load would not be broken.

In this case, the master controller 110 notifies the CPU 150 of communication error, and the CPU 150 causes the display unit 300 to display the fact that the communication error between the master controller 110 and the slave controller 113 has occurred.

FIG. 3C is a timing chart when power source failure has occurred during the serial communication. Similar to FIG. 3A, the master controller cancels the reset if the power ready signal becomes HIGH, to start the serial communication. When a power ready signal of the power supply voltage detection unit 115 becomes LOW during the serial communication, the master controller applies immediately reset to the slave controller, to stop the serial communication.

In this case, the master controller 110 notifies the CPU 150 of the power source failure, and the CPU 150 displays the fact that power source failure of the slave controller 113 has occurred, on the display unit 300, in such a manner that it can be identified from the communication error between master and slave.

As described above, the fact that communication error between the master controller 110 and the slave controller 113 has occurred, and power source failure of the slave controller 113 has occurred, are displayed on the display unit 300, in a identifiable manner. Accordingly, a service person or the like can thereby track down the cause of the abnormality in a short time.

If the cause of the power source failure is tracked down in a short time, then the image forming apparatus where abnormality has occurred can be recovered in a short time, and a time length during which the image forming apparatus cannot be used (downtime) can be reduced.

In the present exemplary embodiment, notification of a content of the abnormality is performed to the service person or the like by the display unit 300, but it is not intended to limit to this method. The notification may be performed by transmitting identification information (ID) of the image forming apparatus as well as a content of the abnormality to a display apparatus located in a monitoring center at a remote place via a communication line.

FIG. 4 is a flowchart illustrating processing executed by the system control unit 101.

First, in step S401, when the power is turned on, the CPU 150 checks power ready from each unit. If the power ready signal is LOW (NO in step S401), then in step S451, the CPU 150 determines whether the low-power ready has continued for a predetermined length of time from the power-on time. If the low-power ready continues within the predetermined length of time (NO in step S451), the process returns to step S401.

If the low-power ready is detected even when the predetermined length of time has elapsed (YES in step S451), the process advances to step S414 described below. In step S401, if the power ready signal is HIGH (YES in step S401), then in step S402, the CPU 150 gives communication start instruction to the master controller 110, and the master controller 110 cancels the reset of the slave controller 113, based on the instruction. In step S403, the master controller 110 starts the serial communication.

After the serial communication is started, in step S411, the CPU 150 detects whether the power ready signal is LOW. If the power ready signal is not LOW (NO in step S411), then in step S404, the master controller 110 determines whether communication of one frame is completed.

If communication of one frame is not completed (NO in step S404), the process returns to step S411. If communication of one frame is completed (YES in step S404), then in step S405, the master controller 110 determines whether communication error has occurred in one frame. As described above, the detection of the communication error is performed by the parity check for each one frame.

In step S405, if the communication error has not occurred (NO in step S405), then the process returns to step S403, and the master controller 110 starts the next serial communication.

In step S405, if the master controller 110 determines that the communication error has occurred (YES in step S405), then in step S406, the master controller 110 stops the serial communication. In step S407, the master controller 110 applies a reset to the slave controller 113. After that, in step S408, the CPU 150 causes the display unit 300 to display the fact that the communication error has occurred between the master controller 110 and the slave controller 113.

In step S411, if the power ready signal becomes LOW (YES in step S411), then in step S412, the master controller 110 stops the serial communication. In step S413, the master controller 110 applies a reset to the slave controller 113. After that, in step S414, the CPU 150 causes the display unit 300 to display the fact that the power source of the slave controller 113 is abnormal.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-219220 filed Sep. 24, 2009, which is hereby incorporated by reference herein in its entirety.

What is claimed is:

1. A control apparatus comprising:
   a lower layer control unit configured to perform control of a load and detect power supply voltage to output a power ready signal;
   an upper layer control unit configured to control the lower layer control unit;
   a first communication line configured to perform serial communication between the upper layer control unit and the lower layer control unit;
   a second communication line configured to transmit a reset signal for controlling resetting the lower layer control unit from the upper layer control unit to the lower layer control unit;
   a third communication line configured to transmit the power ready signal according to the detected power supply voltage from the lower layer control unit to the upper layer control unit,
   wherein the upper layer control unit:
      starts the serial communication via the first communication line based on the power ready signal;
      detects communication abnormality based on data received via the first communication line;
      transmits the reset signal to the lower layer control unit via the second communication line in response to detection of the communication abnormality;
      causes a display unit to display a notification of the communication abnormality;
      detects abnormality of the power supply voltage based on the power ready signal received via the third communication line;
      transmits the reset signal to the lower layer control unit via the second communication line in response to detection of the abnormality of the power supply voltage; and
      causes the display unit to display a notification of the abnormality of the power supply voltage.

2. The control apparatus according to claim 1, further comprising:
   a plurality of the lower layer control units,
   wherein the upper layer control unit controls the plurality of lower layer control units.

3. The control apparatus according to claim 1, wherein the upper layer control unit detects the communication abnormality based on acknowledge bits or parity bits of the data received via the first communication line.

4. The control apparatus according to claim 1, wherein the upper layer control unit stops the communication via the first communication line in response to detection of the abnormality of the power supply voltage.

5. The control apparatus according to claim 1,
   wherein the control apparatus is used for an image forming apparatus; and
   wherein the lower layer control unit controls a fixing unit.

* * * * *